(12) United States Patent
Durdevic et al.

(10) Patent No.: US 9,026,288 B2
(45) Date of Patent: May 5, 2015

(54) METHOD AND DEVICE FOR AUTOMATICALLY CONTROLLING THE GEAR OF AN ELECTRIC BICYCLE TRANSMISSION

(75) Inventors: Ivica Durdevic, Pfullingen (DE); Peter Kimmich, Schoenaich (DE); Philipp Kohlrausch, Stuttgart (DE); Gregor Dasbach, Mondeville (FR); Sigmund Braun, Kusterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 127 days.

(21) Appl. No.: 13/696,468

(22) PCT Filed: Apr. 13, 2011

(86) PCT No.: PCT/EP2011/055803
§ 371 (c)(1),
(2), (4) Date: Jan. 10, 2013

(87) PCT Pub. No.: WO2011/138139
PCT Pub. Date: Nov. 10, 2011

(65) Prior Publication Data
US 2013/0110335 A1 May 2, 2013

(30) Foreign Application Priority Data

May 6, 2010 (DE) .......................... 10 2010 028 658

(51) Int. Cl.
*B60W 10/10* (2012.01)
*B62M 6/45* (2010.01)
(Continued)

(52) U.S. Cl.
CPC ................ *B60W 10/10* (2013.01); *B62M 6/45* (2013.01); *B62M 25/08* (2013.01); *B60L 11/007* (2013.01); *B60L 2200/12* (2013.01)

(58) Field of Classification Search
CPC ..................... B60W 10/10; B60W 2050/0033; B62K 2204/00; B62K 2208/00; B62M 6/45; B62M 25/08; B62M 2025/00
USPC .................................... 701/22, 60, 84; 482/57
See application file for complete search history.

(56) References Cited

U.S. PATENT DOCUMENTS 5,027,303 A * 6/1991 Witte .............................. 702/44
5,256,115 A * 10/1993 Scholder et al. .................. 482/6
(Continued)

FOREIGN PATENT DOCUMENTS

DE 199 49 225 4/2001
DE 20 2005 010 822 11/2005
(Continued)

OTHER PUBLICATIONS

International Search Report, PCT International Application No. PCT/EP2011/055803, dated Jul. 14, 2011.

*Primary Examiner* — Mary Cheung
*Assistant Examiner* — Atul Trivedi
(74) *Attorney, Agent, or Firm* — Kenyon & Kenyon LLP

(57) ABSTRACT

A method for automatically controlling the gear of a gearshift of an electric bicycle. At least one actual operating parameter of a drive component of the electric bicycle is recorded by recording an operating variable of the drive component. The at least one actual operating parameter is compared to a setpoint default, which reflects an operating point of the electric drive, which is linked to a higher efficiency, a greater reliability or a greater durability of components of the electric drive or of the drive component than in response to an operation according to the at least one actual operating parameter. The at least one actual operating parameter is approximated to the setpoint default by changing the gear. A corresponding device for automatically controlling the gear is also described.

9 Claims, 1 Drawing Sheet

(51) Int. Cl.
*B62M 25/08* (2006.01)
*B60L 11/00* (2006.01)

(56) References Cited

U.S. PATENT DOCUMENTS

| | | | |
|---|---|---|---|
| 5,538,477 A * | 7/1996 | Bellio et al. | 474/70 |
| 5,728,017 A * | 3/1998 | Bellio et al. | 474/70 |
| 5,922,035 A * | 7/1999 | Chen | 701/22 |
| 5,971,090 A * | 10/1999 | Tanaka et al. | 180/206.2 |
| 6,047,230 A | 4/2000 | Spencer et al. | |
| 6,163,148 A * | 12/2000 | Takada et al. | 324/226 |
| 6,554,730 B1 * | 4/2003 | Sakai et al. | 475/195 |
| 7,207,584 B2 * | 4/2007 | Forderhase | 280/205 |
| 7,837,595 B2 * | 11/2010 | Rice | 482/4 |
| 2002/0014366 A1 * | 2/2002 | Turner | 180/220 |
| 2005/0140113 A1 * | 6/2005 | Kokatsu et al. | 280/205 |
| 2005/0229731 A1 * | 10/2005 | Parks et al. | 74/122 |
| 2005/0246152 A1 * | 11/2005 | Kokatsu et al. | 703/22 |
| 2006/0003872 A1 * | 1/2006 | Chiles et al. | 482/57 |
| 2006/0095191 A1 * | 5/2006 | Lin | 701/84 |
| 2007/0149364 A1 * | 6/2007 | Blau et al. | 482/57 |
| 2007/0179024 A1 * | 8/2007 | Maenpaa et al. | 482/57 |
| 2008/0071436 A1 * | 3/2008 | Dube et al. | 701/22 |
| 2008/0195266 A1 * | 8/2008 | Le Neindre et al. | 701/22 |
| 2009/0286654 A1 * | 11/2009 | Rice | 482/4 |
| 2010/0155167 A1 * | 6/2010 | Pesenti | 180/206 |
| 2011/0144841 A1 * | 6/2011 | Ruben | 701/22 |
| 2011/0183805 A1 * | 7/2011 | Chan | 475/254 |
| 2011/0303474 A1 | 12/2011 | Kimmich et al. | |
| 2012/0081080 A1 * | 4/2012 | Aoki et al. | 320/137 |
| 2012/0083954 A1 * | 4/2012 | Aoki et al. | 701/22 |
| 2012/0083956 A1 * | 4/2012 | Aoki et al. | 701/22 |
| 2012/0083957 A1 * | 4/2012 | Aoki et al. | 701/22 |
| 2013/0110335 A1 * | 5/2013 | Durdevic et al. | 701/22 |

FOREIGN PATENT DOCUMENTS

| | | |
|---|---|---|
| DE | 20 2005 018 126 | 2/2006 |
| DE | 10 2009 045 447 | 6/2010 |
| EP | 0 937 600 | 8/1999 |
| EP | 1 457 415 | 9/2004 |
| JP | 10 194185 | 7/1998 |
| JP | 11 147 494 | 6/1999 |
| WO | WO 00/43259 | 7/2000 |
| WO | WO 2008/095116 | 8/2008 |

* cited by examiner

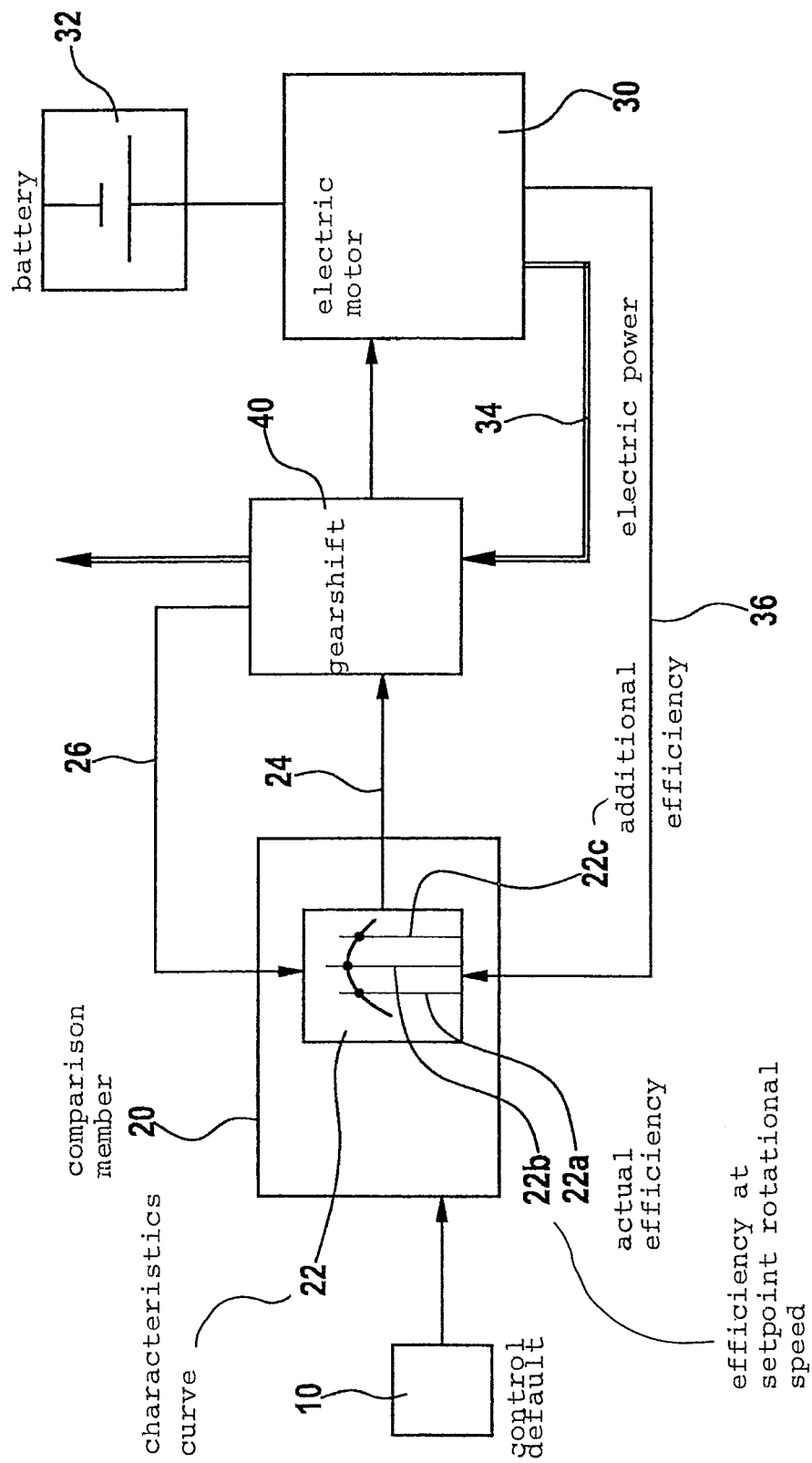

METHOD AND DEVICE FOR AUTOMATICALLY CONTROLLING THE GEAR OF AN ELECTRIC BICYCLE TRANSMISSION

BACKGROUND INFORMATION

In the field of electric bicycles, gearshift controls are used, for changing the gear ratios between the crank drive and the output according to the cyclist's intention.

Conventionally, a user sets a setpoint pedal frequency, and the gear according to this setpoint pedal frequency is selected so as to adjust the actual pedal frequency to it.

German Patent Application No. DE 20 2005 010 822 U1 describes an adjustable, stepless transmission which regulates a gear ratio in such a way that the pedal power specified by the cyclist is held constant.

However, the conventional regulating offers only limited comfort, and does not take into account the problem that a suboptimal operation is neither able to be detected, nor taken into account by the controller during the setting of the gear. It is an object of the present invention to provide a gear-shifting regulation that has an optimized operating manner.

SUMMARY

In accordance with the present invention, during the gear selection of a manually shifted transmission of an electric bicycle, individual values are set as desired by the cyclist, taking into account in the regulation, efficiency and other operating parameters of the electric drive.

According to an example embodiment of the present invention, within the control system that provides the gear selection, at least one operating parameter of the electric drive is also considered, so as to select, according to specified normal intervals or protective intervals or maximum stress intervals, the gear in such a way that the operating parameter lies in the normal interval and not in a protective or maximum stress interval in which either the motor drive could possibly be damaged or is functioning in suboptimal fashion.

The example embodiment of the present invention provides a method for automatically controlling the gear of a gearshift of an electric bicycle. The gearshift enables the selection among a limited number of gears that are each linked to different, discrete gear ratios. By the selection of the gear, one is able to change parameters, such as the electric motor speed, power required by the electric motor and other operating parameters, so as to change the operating parameters with the aim of controlling the efficiency, for example, or of optimizing the battery power that is linked to these parameters.

Furthermore, in order to reduce the mechanical stress on the gearshift, for example, (below a specified level), the time of the gear change may also be specifically selected, so that the gear change is carried out at a moment of load that is below a specified level. The moment of load is directly linked to the torque exerted by the cyclist on the pedal crank or introduced by the motor into the drive train. One may therefore await a slight momentary torque to carry out a desired gear change or reduce the motor torque specifically at the gear change. In this case, the emphasis is not the right selection of the gear (as in the preceding example), but the actuation over time with which the gear is changed.

According to an example embodiment of the present invention, at least one actual operating parameter of a drive component of the electric bicycle is recorded. As the actual operating parameter one should understand an operating variable of the drive component. The actual operating parameter or the operating variable is a physical quantity which reflects the current operation of the drive component, and which is able to be recorded by (at least) one sensor, for instance, a rotational speed sensor or a torque sensor, the operating variable also being able to be derived from sensor data or actuation information (such as for controlling the rotational speed, the power, the torque or the motor current).

An operating variable of the drive component is recorded. The associated, at least one actual operating parameter is compared to a setpoint default, which reflects a more optimal operating point of the electric drive, i.e., a drive component driven by the electric drive, that is linked to a higher efficiency, greater reliability or greater durability of components of the electric or other drive. The setpoint default is linked to an efficiency, a reliability or a durability which are greater than in the case of current operation, i.e., an operation according to the at least one actual operating parameter. The at least one operating parameter is approximated to the setpoint default by changing gear, that is, by actuating the gearshift. The gearshift is actuated automatically, for example, by an electric or electronic controller, the abovementioned steps of recording and comparing being able to be performed just as well automatically, i.e., by the controller.

The setpoint default relates to the same physical variable as the actual operating parameter, especially variables that reflect the operating state of a drive component. For this reason, the setpoint default could also be designated as the setpoint operating parameter.

Regarded as the control system, the actual operating parameter, or a quantity derived from it, is fed back, the comparison is formed by detecting a deviation between the setpoint and the actual quantity, and, as the setting device within the control system, the gearshift (or an electrical actuator that changes the gears) is shifted. A correcting device within the control system decides whether the actual operating point is able to be improved by changing gear, the gears providing a plurality of discretely different gear ratios between drive and output, the correction device preferably providing a hysteresis, in order to avoid gear changes that that repeat and alternate at transitional ranges. The aim of the regulation is as near as possible an approximation (including exact agreement) between the actual operating state and a state in which, as a function of the execution of the present invention, the efficiency, the reliability or the durability of the drive components is a maximum.

The efficiency is especially the efficiency of the electric motor, if necessary, inclusive of the power control that supplies the electric motor and the downstream transmission. In the same way, the efficiency of the battery may be taken into account. The efficiency depends particularly on the rotational speed or other operating parameters of the electric motor, as a function of the design-conditioned properties. The dependence between efficiency and actual operating parameters (such as rotational speed) of the motor is continuous and is stored in the device which provides the controller, for example, as a characteristics curve or individual characteristics curve points.

The reliability relates to the failure probability of drive components (i.e., electric motor, pedal crank drive, components driven by it, as well as the battery that supplies the electric motor), a high reliability being linked to a low failure probability. The dependence of reliability (that is, a value which reflects the reliability, for instance, as the reciprocal of the failure probability) and the actual operating parameter (such as rotational speed) of the drive, for example, the temperature of the motor or of the battery, is stored in the device that provides the controller. The dependence must particularly not be continuous, such as in the form of a boundary value, which separates a normal operation having high reliability from an extreme operation having a clearly greater failure probability. In this case, the example method intervenes only when the normal operation is left behind, that is, the boundary value is exceeded, so that the regulation works with discrete values. The reliability particularly relates to the gearshift itself, a shifting process in response to a pedal crank torque above a specified boundary being ranked as unreliable (low reliability value) and is ranked below the specified boundary as having a greater reliability.

The boundary reflects the pedal crank torque, as of which a shifting process (at this torque), may lead to the gearshift not carrying out exclusively the actuated motion, that is, the gearshift jumps to an undesired gear based on the high torque. Furthermore, the boundary may give the torque value at which a functional impairment of the gearshift comes about, the functional impairment being able to be temporary or lasting. The boundary is given directly from the mechanical stressability of the transmission, and may thus be specified according to the gearshift design.

The durability relates to the stressability of drive components (i.e., particularly the gearshift as well as further the electric motor, the pedal crank drive, additional components driven by it, as well as the battery that supplies the electric motor), a high reliability being linked to a low failure probability. The durability depends particularly on the torque at which the pedal crank drive is being operated or which the motor gives off, but also on the rotational speed of the motor or the temperature of the motor or of the battery or of the power control which supplies the motor, according to the design-conditioned properties of these components. The dependence of durability (i.e., a value that reflects the wear of the components) and the actual operating parameter, i.e., torque acting upon the gearshift, or torque, rotational speed or power of the motor, or the temperature of the motor, of the associated power control, or of the battery, is stored in the device which provides the controller. The dependence may particularly not be continuous, such as in the form of a boundary value, which separates a normal operation having high reliability from an extreme operation having a clearly greater failure probability. In this case, the method intervenes only when the normal operation is left behind, that is, the boundary value is exceeded, so that the regulation works with discrete values. Moreover, the example method may hold back a gear change until an operating range is reached that is linked to a high durability (i.e., low wear). In this instance, the operating range is recorded with the aid of an operating parameter, for instance, with the aid of the pedal crank torque, the latter changing periodically with the half crank revolution, so that the delay does not exceed a half crank rotation. Furthermore, an operating parameter may be averaged over a time window (e.g., 1-10 sec), in order to record usually frequently occurring phases of weaker pedal crank operation (i.e., lower pedal crank torque), and in response to the falling below the torque boundary, to trigger the temporarily stored shifting process.

According to a first specific embodiment, the rotational speed of the electric motor is recorded as the operating variable of the drive component, as the at least one actual operating parameter. The setpoint default reflects a rotational speed at which the electric motor operates at a higher efficiency than the recorded rotational speed which represents the actual operating parameter. The gear is selected so that the efficiency of the electric drive is greater than in the case of other gears. Since the transmission ratio of the gearshift is determined using the gear, there comes about directly from this a connection between the selected gear and the rotational speed of the motor at a given speed. The controllable transmission ratio is thus tied to the control system which determines the drive power of the electric motor.

According to a second specific embodiment, a pedal crank torque is recorded as the variable of driven electric bicycle components as the at least one actual operating parameter. The pedal crank torque is equivalent to the drive torque of the pedal crank. The setpoint default reflects a maximum torque (i.e., a boundary), below which the pedal crank drive components, especially the shift gear transmission, are able to carry out a gear change without lasting damage. The time of the gear change is selected in such a way that the recorded pedal crank torque is less than the maximum torque during the gear change. This maximizes the reliability and the durability.

One variant of the second specific embodiment provides that a gear command be entered. If the gear command deviates from the current gear, a gear change corresponding to the gear command is delayed until the point in time of the gear change has been reached at which the recorded pedal crank torque and the motor torque are below the maximum torque.

According to a third specific embodiment, the at least one actual operating parameter is recorded in the form of a rotational speed of the rear wheel as the operating variable of the electric motor and of the gearshift as drive components. Since the gearshift has a known transmission ratio, and the transmission ratio of the motor transmission is provided to be conditioned upon the design and is known, instead of a direct recording of the motor's rotational speed (that is, the rotor of the electric motor) the rear-wheel rotational speed may be ascertained, from which one may simply conclude the motor's rotational speed (with the aid of the known transmission ratio). According to the present invention, there takes place, therefore, a recalculation of the rear wheel rotational speed to the electric motor rotational speed with the aid of the known transmission ratios. Alternatively, the comparison of the regulation may be carried out in a plane which differs from the electric motor rotational speed, so that, according to the example method, the setpoint default reflects a rear wheel rotational speed, as a function of a set gear, and the rear wheel rotational speed itself is used as the actual default. If the comparison shows a deviation between the setpoint default and the actual default, that the current efficiency deviates by more than a specified margin (or maximum deviation) from a greater efficiency, which would be yielded by another transmission ratio of the gearshift, the gearshift is set to the transmission ratio (by the selection of the gear), which is linked to a greater efficiency of the electric motor. According to the third specific embodiment, the setpoint default reflects a rotational speed of the rear wheel as a function of the selected gear, that is linked to a rotational speed of the electric motor at which the latter operates at a greater efficiency. The gear is selected so that the efficiency of the electric drive is greater than in the case of other gears. The gear that is selected (i.e., that is to be actuated) together with the rotational speed of the electric motor at which a greater efficiency is achieved, provides a rear wheel rotational speed which no longer deviates as a specified maximum deviation from the recorded rotational speed of the rear wheel. Because of this measure, the speed of the bicycle is maintained as well as possible, the efficiency being optimized simultaneously by the suitable gear selection.

According to a fourth specific embodiment, a current of the electric motor is recorded, which the motor takes up, as the at least one actual operating parameter. The setpoint default reflects a maximum output current below which a battery, that supplies the motor, remains without permanent damage and without danger of overheating, the gear being selected so that the current is below the maximum output current. This increases the durability, or rather, the fault tolerance is reduced, since the battery is not operated outside the normal range, this being achieved by suitable gear selection. Furthermore, a return to the normal range (starting from an extreme operating range) is achieved in that, because of the gear selection, the electric motor is operated at better efficiency, whereby the take-up of current and thus the load of the battery changes. The boundary that marks the normal range depends on the temperature of the battery and perhaps on its charging state, so that these two parameters are also taken into account by the controller according to the present invention, in order to increase the durability of the battery and decrease the probability of failure. Instead of the battery or in combination with it, an operating parameter of the power output of the motor (such as the temperature of the power control) is taken into account in the same manner as operating parameters of the battery.

According to a fifth specific embodiment, which also relates to the battery, a current of the electric motor is recorded, which the motor takes up, as the at least one actual operating parameter. The setpoint default reflects a maximum output current, below which a charging state of a battery, which supplies the electric motor, is sufficient for supplying the electric motor for a specified distance. Consequently, the charging state may also be taken into account in the regulation as an actual operating parameter, the gear selection taking its cue from this. The gear is selected so that the maximum output current, that comes about due to distance and charging state, is not exceeded. The distance to be bridged may be entered through a user interface.

The abovementioned specific embodiments may be combined with one another at will, all the operating variables of the drive component named herein being ale to be provided as setpoint and actual operating parameters. The drive components are particularly the electric motor, the electric motor transmission, the pedal crank drive, the gearshift and the output. The present invention makes possible the optimization of the operating parameters of these drive components with the aid of gear selection, which is undertaken by the gearshift and especially by an electromechanical actuator, which shifts the gearshift.

The setpoint default is selected from a plurality of setpoint specifications according to a selectable travel program. Different setpoint defaults are associated with various travel programs. The travel programs are able to be entered via a user interface.

The present invention further provides an example device for automatically controlling the gear of a gearshift of an electric bicycle. The example device includes: a sensor device configured to record at least one actual operating parameter of a drive component of the electric bicycle, the sensor device being connected to the drive component in order to record an operating variable of the drive component. The device also includes a comparative device configured to compare the at least one actual operating parameter to a setpoint default, which reflects an operating point of the electric drive, that is linked to a greater efficiency, a greater reliability or a greater durability of components of the electric drive or the drive component.

The setpoint default is stored in a memory of the device. The device additionally includes a gear shifting actuator, which is equipped to change the gear of a gearshift of the electric bicycle that is able to be connected to the gear shifting actuator. The device also provides a controller which is connected to the comparative device to receive the difference between actual operating parameters and the setpoint default. The controller is configured, by actuating the gear shifting actuator connected to it, to approximate the at least one actual operating parameter to the setpoint operating parameter by changing the gear.

BRIEF DESCRIPTION OF THE DRAWING

Exemplary embodiments of the present inventions are illustrated in the FIGURE and explained in greater detail below.

FIG. 1 shows a control system to explain the example method according to the present invention.

DETAILED DESCRIPTION OF EXAMPLE EMBODIMENTS

FIG. 1 shows a control system which schematically reflects an execution of an example method according to the present invention.

The control system shown in FIG. 1 provides a control default 10 which is implemented in comparison member 20. For a better understanding, control default 10 is shown as a single element. Control default 10 specifies as control target a maximum efficiency of electric motor 30. In comparison member 20, there is a characteristics curve 22 of electric motor 30, which is shown symbolically, the efficiency being plotted on the y axis of characteristics curve 22 and the rotational speed being plotted on the x axis of characteristics curve 22. Consequently, in comparison member 20, a relationship is stored between an actual operating variable (rotational speed of the electric motor) and the resulting variable of the control default (i.e., the efficiency).

The motor may include a transmission that is not shown, whose transmission ratio is stored in the comparison member. The motor is driven by battery 32, and it converts the transmitted electric power to motor power, whose transmission is shown using a double arrow 34. Motor 30 is connected to a gearshift 40 via mechanical power transmission 34, which converts the motor motion, according to the gear set in gearshift 40 in rotational speed, to torque. Gearshift 40 gives off the modified rotational motion to an output (not shown).

As the manipulated variable, comparison member 20 outputs a gear to be set (i.e., a transmission ratio of a limited number of gear ratios that are able to be set) to gearshift 40, for instance, a bicycle chain gearshift. Gearshift 40 is actuated by comparison member 20 and forms the controlling element of the regulation. The information concerning the current gear is present in comparison member 20 because of the actuating connection 24, which leads from comparison member 20 to gearshift 40. Additional arrow 26 represents the associated information flow, which does not, however, actually have to take place if it is assumed that gearshift 40 inserts the actuated gear. Additional arrow 26 may start with an additional gear sensor at gearshift 40, which detects the actual gear and reports it to comparison member 20. Comparison member 20 also receives, via connection 36, the current rotational speed of electric motor 30 as an actual operating parameter, in order to be able to derive from this the current efficiency.

If only the travel speed, i.e., the rotational speed of the wheel, is known, that is, if connection 36 is not present, comparison member 20 is able to set up the current rotational speed of motor 30 based on the knowledge of the fixed transmission ratios of the motor drive and the inserted gear (cf. information flow 26). Based on feedback 36, however, in the specific embodiment shown in FIG. 1, the actual rotational speed is present at comparison member 20 as an actual operating parameter. Comparison member 20 ascertains the associated (i.e., current) efficiency 22a with the aid of characteristics curve 22 and compares this efficiency to other efficiencies 22b, 22c, which would come about at other rotational speeds, which correspond to other transmission ratios of gearshift 40 that are able to be set.

It is ascertained by comparison that efficiency 22b, which may be reached using the associated setpoint rotational speed (and the gear linked to that), is above actual efficiency 22a and above additional efficiency 22c, the latter able to be reached by gear selection. Therefore, according to the regulation default, the gear is selected having the highest efficiency. Moreover, the rotational speed of motor 40 is set to that rotational speed which is linked to the highest efficiency according to characteristics curve 22. The last-named step generally corresponds to the adjustment of additional operating variables of the drive components to the actuated gear of gearshift 40. Actual efficiency 22a corresponds to the efficiency of the current rotational speed, efficiency 22b corresponds to the highest efficiency ascertained, i.e., the setpoint efficiency, and efficiency 22c corresponds to an additional, possible efficiency in the case of another gear that is compared to efficiency 22b so as to ascertain that gear at whose rotational speed the highest efficiency is provided.

Within the context of the example method, the actual operating parameter of the current motor rotational speed of connection 36, the setpoint default corresponding to that rotational speed which is characterized by line 22b. Since the setpoint default is linked to a higher efficiency (=aim of the regulation), the actual operating parameter, i.e., the current rotational speed of the setpoint default, that is, the rotational speed having the highest efficiency, is adjusted by changing gear. The gear to which the change is made, is linked to a transmission ratio which leads to a rotational speed 22b which, based on characteristics curve 22 is linked to a higher efficiency.

Regulation default 10 may be regarded as a part of an outer control system, which is aimed at the maximization of efficiency, reliability or durability. The setpoint default relates to an inner control system shown in greater detail, and relates to operating variables of drive components such as rotational speed, torque, motor current, motor or battery temperature, motor power or other variables that are recorded, and whose change goes along with a change in efficiency, reliability or durability (=variables of the control default).

What is claimed is:

1. A method for the automatic control of the gear of a gearshift of an electric bicycle, comprising:
   recording at least one actual operating parameter of a drive component of the electric bicycle by recording an operating variable of the drive component;
   comparing the at least one actual operating parameter to a setpoint operating parameter which reflects an operating point of the drive component, which is linked to a higher efficiency, a greater reliability or a greater durability of components of the electric drive or of the drive component via a stored linkage, than in response to an operation according to at least one actual operating parameter; and
   approximating the at least one actual operating parameter to the setpoint default by changing the gear to provide greater efficiency, reliability, or durability of components of the electric drive or of the drive component via a stored linkage.

2. The method as recited in claim 1, wherein, as the at least one actual operating parameter, a rotational speed of the electric motor is recorded as the operating variable of the drive component, the setpoint default reflecting a rotational speed at which the electric motor operates at a higher efficiency than the recorded rotational speed as the actual operating parameter and the gear is selected so that the efficiency of the electric drive is greater than in response to other gears.

3. The method as recited in claim 1, wherein, as the at least one actual operating parameter, a pedal crank torque is recorded as a variable of driven electric bicycle components, the pedal crank torque corresponding to the drive torque of the pedal crank, wherein the setpoint default reflects a maximum torque, below which the pedal crank drive components are able to carry out a gear change without lasting damage, and wherein a point in time of a gear change is selected in such a way that the recorded pedal crank torque is less than the maximum torque during the gear change.

4. The method as recited in claim 3, wherein a gear command is entered and, if the gear command differs from the current gear, a gear change is delayed until that time of the gear change is reached at which the recorded pedal crank torque is less than the maximum torque.

5. The method as recited in claim 1, wherein the at least one actual operating parameter is recorded in the form of a rotational speed of a rear wheel as the operating variable of the electric motor and of the gearshift as drive components, the setpoint default reflecting a rotational speed of the rear wheel as a function of the selected gear which is linked to a rotational speed of the electric motor, at which the latter operates at a higher efficiency, and wherein the gear is selected so that the efficiency of the electric drive is greater than in the case of other gears, and the selected gear, together with the rotational speed of the electric motor, at which a greater efficiency is achieved, provide a rotational speed of the rear wheel, which does not deviate by more than a specified maximum deviation from the recorded rotational speed of the rear wheel.

6. The method as recited in claim 1, wherein, as the at least one actual operating parameter, a current of the electric motor is recorded which is taken up by the electric motor, the setpoint default reflecting a maximum output current, below which a battery, which supplies the electric motor, remains without lasting damage and without the danger of overheating, and wherein the gear is selected so that the current is below the maximum output current.

7. The method as recited in claim 1, wherein, as the at least one actual operating parameter, a current of the electric motor is recorded which is taken up by the electric motor, the setpoint default reflecting a maximum output current, below which a charging state of a battery, which supplies the electric motor, is sufficient to supply the electric motor for a specified distance, and wherein the gear is selected so that the maximum output current coming about from the distance and the charging state is not exceeded.

8. The method as recited in claim 1, wherein the setpoint default is selected from a plurality of setpoint defaults according to selectable travel programs, and wherein different setpoint defaults are associated with various travel programs.

9. A device for the automatic control of a gear of a gearshift of an electric bicycle, comprising:
   a sensor device configured to record at least one actual operating parameter of a drive component of the electric bicycle, the sensor device being connected to the drive component to record an operating variable of the drive component;
   a comparison device configured to compare the at least one actual operating parameter to a setpoint default, which reflects an operating point of the electric drive that is linked to one of a greater efficiency, a greater reliability or a greater durability of components of the electric drive or of the drive component, the setpoint default being stored in a memory of the device;

a gear switching actuator configured to change a gear of a gearshift of the electric bicycle that is able to be connected to the gear switching actuator; and a controller connected to the comparison device to receive a difference between the actual operating parameter and the setpoint default provided by the comparison device, the controller being configured to approximate the at least one actual operating parameter to the setpoint default by changing the gear to provide greater efficiency, reliability, or durability of components of the electric drive or of the drive component via a stored linkage, by actuating the gear switching actuator connected to the controller.

* * * * *